Patented Aug. 27, 1946

2,406,549

UNITED STATES PATENT OFFICE 2,406,549

LUBRICANT CONTAINING CONDENSATION PRODUCT

Eugene Lieber, West New Brighton, Staten Island, N. Y., assignor to Standard Oil Development Company, a corporation of Delaware No Drawing. Application October 28, 1941, Serial No. 416,825

7 Claims. (Cl. 252—57)

This invention relates to a novel type of chemical condensation products and to methods of preparing such products and using them for various purposes, more particularly as pour depressors in waxy lubricating oils, and as dyes, etc. Heretofore pour depressors have generally been made by chemical condensation of long-chain aliphatic substances, such as chlorinated paraffin wax or corresponding long chain olefins, with an aromatic compound, such as naphthalene. Such pour depressors are high molecular weight compounds with a complex chemical structure not well understood, but it has always been considered necessary in the preparation of pour depressors, to use some materials containing long-chain aliphatic groups. Attempts have also been made in the past to produce pour depressors from aliphatic materials containing oxygen, such as esters, but successful pour-depressor results could only be obtained by using esters containing long-chain aliphatic groups, such as at least 10 or 12 carbon atoms and preferably more, such as 16, 18, 22, and the like.

It has now been found possible to make pour depressors from esters containing less than 10 carbon atoms by selecting special conditions for reacting them with a suitable aromatic compound, such as naphthalene.

Broadly, the invention comprises the chemical condensation of lower esters, i. e., those having less than 10 carbon atoms with aromatic compounds in the presence of a Friedel-Crafts catalyst, using a sufficiently large amount of catalyst to effect the desired condensation.

The esters to be used according to the present invention contain less than 10 carbon atoms and preferably less than 8 carbon atoms. The hydrocarbon groups in such esters should contain less than 7 carbon atoms. The acid radicals of these esters may originate from either organic or inorganic acids, but the remaining portion of the ester should originate from organic hydroxy compounds, such as alkyl alcohols or phenols or substituted derivatives of such hydroxy compounds. When the esters are entirely organic they should contain at least one —COOR' group in which R' is an aliphatic hydrocarbon, preferably an alkyl radical, and they may have various general formulas such as the following:

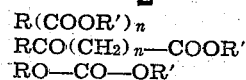

where R and R' are saturated hydrocarbon radicals or unsaturated or chlorinated derivatives thereof, at least one, preferably R', being aliphatic and the other being aliphatic or cyclic in structure, and $n$ being an integer of 1, 2, 3, or more. Specific examples of esters coming within the general formulas described above include:

Methyl acetate
Propyl acetate
Butyl acetate
Amyl acetate
Methyl butyrate
Isopropyl butyrate
Di-isopropyl phthalate
Di-ethyl carbonate
Ethyl silicate
Ethyl phosphate
Amyl borate
Methyl ester of monochloracetic acid
Amyl ester of propenoic acid
Di-allyl phthalate
Allyl acetate Also, if desired, mixtures of various esters may be used, especially commercial mixtures of materials which are isomeric or very similar in structure, as, for example, the product known as "Pent-acetate," which is the acetic acid ester of a commercial mixture of amyl alcohols made from mixed amylenes. It is indeed very surprising that such condensation can be effected without having in the ester any reactive group, such as an olefinic linkage or a replaceable halogen atom, as is necessary in order to combine a paraffin wax molecule with naphthalene.

The aromatic compounds to be used as the other primary raw material according to this invention may be of various types with the primary requisite that they contain one or more replaceable hydrogen atoms on the aromatic nucleus. Of the various types of aromatic compounds available, the hydrocarbons are preferred, such as naphthalene, benzene, diphenyl, phenanthrene, toluene, amyl benzene, retene (which is 1-methyl-7-isopropyl phenanthrene), fluorene (diphenylene methane), chrysene ($C_{18}H_{12}$), etc. Aromatic compounds which may be considered as aromatic hydrocarbons containing substituent groups containing one or more nonhydrocarbon elements, such as oxygen, nitrogen, etc., may also be used, for instance, the following hydroxy aromatic hydrocarbons:

Phenol
Alpha-naphthol
Beta-naphthol
Cresol
Anisol
Amyl phenol

Suitable nitrogen derivatives include aniline, toluidine, naphthyl amine, etc.

Of the condensing agents to be used Friedel-Crafts catalysts are preferred, and of these anhydrous aluminum chloride is preferred, but others may be used, such as ferric chloride, boron fluoride, antimony chloride, stannic chloride, and zinc chloride. Other condensation catalysts or condensing agents include sulfuric acid, hydrogen fluoride, activated clays, silica gels, semi-divided metals, such as zinc, aluminum, etc.

Although the use of a solvent is optional in this chemical reaction, it is to be preferred, and of the various materials suitable, hydrocarbon solvents, such as a refined kerosene, high-boiling naphtha, etc., may be mentioned, and various halogenated hydrocarbon solvents, such as tetrachlorethane, ethylene dichloride, chlorobenzene, dichloro benzene, etc.

The proportions of the reactants to be used in carrying out this invention may be varied over a fairly wide range, as for instance, 0.2–5.0 mols, preferably 0.5–2.0 mols, of an ester for one mol of aromatic compound, the amount of catalyst of the Friedel-Crafts type, such as aluminum chloride, should be about 0.5–5.0 mols, preferably 1–3 mols, per mol of ester. If a solvent is used, the amount thereof should be about ½–5 volumes per volume of mixed reactants. The temperature used for carrying out the reaction should not be permitted to exceed 300° F., and preferably should be between the approximate limits of room temperature and about 250° F. A convenient method of carrying out the reaction is to start the reaction at room temperature until all of the materials have been added, and as the reaction begins to subside, to start the application of heat until a suitable elevated temperature, such as 150° F. or 250° F. or more is reached and then to maintain such reaction temperature until the reaction has been completed, which will usually not take longer than 5 hours or so. After the reaction has been completed, the reaction mixture is preferably cooled and diluted with some solvent such as kerosene, or a halogenated solvent, preferably the same kind as was used during the reaction, if any was used then. After such cooling and dilution, the catalyst is hydrolyzed by contacting the reaction mass with water, dilute caustic soda, alcohol, and mixtures of such suitable media, and the resulting catalyst sludge is settled out and removed. The condensation products are then distilled either with fire and steam or with vacuum distillation, e. g., under an absolute pressure of 100 mm., 50 mm., 20 mm., or even less of mercury, to a suitable temperature such as about 600° F. in order to remove solvent and low boiling products and to obtain as distillation residue the desired high molecular weight condensation product having pour-depressing and other valuable properties.

This novel condensation product has a physical consistency or temperature range from a viscous oil to a resinous solid which may in some cases be very hard and brittle. Its color is usually green, brown, or black, or some intermediate shade. The product is soluble in mineral oils and is very useful therein for reducing pour point and at least in some cases it is also very useful as a green dye suitable as a lubricating oil dye, i. e., having a red through color and a green fluorescence.

The pour-depressing value of this novel condensation product is due to its property of modifying the crystal structure of paraffin wax present in lubricating oils, for instance, when about .05–10.0%, preferably 0.2–5.0%, of this wax modifier is added to a waxy lubricating oil such as a Pennsylvania type or other paraffinic lubricating oil having a relatively high pour point, the resultant blend will have a substantially lower pour point. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes, such as coating or impregnating papers or for making various molded products.

For the sake of illustration but without intending to limit the invention to the particular materials used, some experimental data are given herewith.

The procedure used in the first test will be discussed in detail and then the materials, proportions, and reaction conditions used in all of the tests, as well as the results obtained thereby, are outlined in a table, it being understood that the process used for all of the tests is the same as that used in the first one, except when otherwise noted in the table.

In carrying out the first test, 118 grams of di-ethyl carbonate having the formula $$(C_2H_5O)_2CO$$

and 128 grams of naphthalene were dissolved in 300 cc. of kerosene (which had been highly pretreated with aluminum chloride before use in order to make it inert), contained in a suitable reaction vessel fitted with a mechanical stirrer, thermometer, reflux condenser and means for heating and cooling. The stirrer was started and while maintaining the reaction mixture at 90–100° F. 266 grams of aluminum chloride were slowly added to the reaction mixture over a period of one hour. After the addition of the aluminum chloride, the reaction mixture was heated to 200° F. and maintained thereat for three hours. At the conclusion of this time, the reaction mixture was cooled and diluted with a further quantity of kerosene. The aluminum chloride was decomposed by the addition of water and the resulting kerosene extract was washed free of acid. It was then distilled with fire and steam to 600° F. in order to remove solvent and low-boiling products. 132 grams of a bottoms residue comprising a brown resinous substance was obtained as product. When 2% of this condensation product was added to a waxy lubricating oil base stock having a pour point of +30° F., the pour point was lowered to −15° F., thereby showing that this condensation product is an effective pour depressor.

It should be noted that in this first test, the aluminum chloride was added last to the reaction vessel, whereas, as indicated in the table, in many of the other tests the aluminum chloride was mixed with the naphthalene or other aromatic compound, and the solvent, and finally the ester was added last. In all the tests the reaction was started at 90° F. and the final heating temperature was 200° F.

Table

| Test No. | Ester Kind | Ester Gms. | Aromatic Kind | Aromatic Gms. | AlCl₃, gms.[3] | Solvent (300 cc. used) | Heating time, hrs. | Yield, gms. | °F. pour point in +30° F. oil | Product |
|---|---|---|---|---|---|---|---|---|---|---|
| 1 | Diethyl carbonate | 118 | $C_{10}H_8$ | 128 | [1]266 | Kerosene[2] | 3 | 132 | −15 | Brown resinous. |
| 2 | Amyl acetates (mixed) | [1]98 | $C_{10}H_8$ | 96 | 266 | ----do---- | 3 | 114 | −15 | Do. |
| 3 | ----do---- | [1]98 | $C_{10}H_8$ | 64 | 266 | ----do---- | 3 | 139 | −5 | Do. |
| 4 | ----do---- | [1]98 | Retene | 96 | 266 | ----do---- | 3 | [3]154 | −5 | Green oil. |
| 5 | Ethyl acetate | [1]89 | $C_{10}H_8$ | 128 | 266 | ----do---- | 3 | 128 | −10 | Black oil green dye. |
| 6 | ----do---- | [1]89 | $C_6H_6$ | 78 | 266 | Tetrachlorethane | 3 | 60 | −15 | Brown viscous oil. |
| 7 | Sec. but. acetate | [1]116 | $C_{10}H_8$ | 128 | 266 | ----do---- | 3 | 170 | 0 | Green viscous oil. |
| 8 | Meth. aceto acetate | [1]131 | $C_{10}H_8$ | 128 | 266 | Kerosene[2] | 2 | 60 | −5 | Brown resinous green dye. |
| 9 | ----do---- | [1]100 | $C_{10}H_8$ | 128 | 266 | ----do---- | 2 | 106 | −5 | Red-brown resinous. |
| 10 | ----do---- | 131 | $C_{10}H_8$ | 128 | [1]266 | Tetrachlorethane | 3 | 76 | −10 | Brittle black resinous green dye. |
| 11 | ----do---- | 75 | $C_{10}H_8$ | 128 | [1]266 | ----do---- | 3 | 52 | −30 | Brown resinous. |
| 12 | ----do---- | [1]131 | Tetralin | 132 | 266 | ----do---- | 2 | 65 | 0 | 5%/−10° F. resinous. |
| 13 | ----do---- | [1]131 | $C_6H_6$ | 26 | 266 | Kerosene | 2 | 26 | −25 | Brown viscous oil. |
| 14 | ----do---- | [1]100 | $C_6H_6$ | 78 | 266 | Tetrachlorethane | 2 | 32 |  | 5%/−10° F. black resinous green dye. |

[1] Added last.
[2] Made inert by heavy pretreatment with AlCl₃.
[3] Distillation stopped at 500° F.

The above table of data shows that good pour depressors can be made from many different types of lower esters, such as diethyl carbonate, ethyl acetate, amyl acetate, secondary butyl acetate, and methyl aceto acetate, and they also show that these unexpectedly satisfactory results can be obtained by using a number of other different aromatic compounds and using a substantially wide range of proportions of ester to aromatic compound. Good results were obtained both with a highly refined and inert kerosene as well as with tetrachlorethane as solvent. A number of the products not only were good pour depressors but also had the additional valuable property of being effective dyes suitable for imparting to the oil a green fluorescence or enhancing such property if it is already present to some degree. The most important pour depressor obtained was that produced in test 11 by reacting 75 grams of methyl aceto acetate with 128 grams of naphthalene using 266 grams of aluminum chloride (added last) in the presence of 300 cc. of tetrachlorethane, the materials being first mixed slowly at about 90° F. and then heated to about 200° F. for 3 hours, resulting in 52 grams of brown, resinous product, 2% of which reduced the pour point of a waxy mineral lubricating oil stock from +30° F. to −30° F.

The novel condensation products of this invention may, if desired, be added to other types of lubricating oil base stocks, such as those derived from naphthenic or mixed naphthenic-paraffinic base crudes, and may also be added to other types of petroleum fractions, such as naphtha, gasoline, kerosene, fuel oil, Diesel oil, etc.

It is not intended that this invention be limited to any of the specific examples, which have been given merely for the sake of illustration, but only by the appended claims in which it is intended to claim all novelty inherent in the invention as well as any equivalents coming within the scope and spirit of the invention.

I claim:

1. A lubricant comprising a major proportion of lubricating oil and a pour-depressing amount of a Friedel-Crafts condensation product of an aromatic compound and a saturated ester having less than 10 carbon atoms, said condensation product being soluble in mineral oils, and substantially non-volatile at temperatures up to 600° F. under fire and steam distillation.

2. A lubricant according to claim 1 containing a condensation product of an aromatic hydrocarbon and a saturated ester having less than 10 carbon atoms containing at least one —COOR group in which R represents an alkyl radical.

3. Lubricant according to claim 1 containing the condensation product of an aromatic hydrocarbon and an ester of an alkyl alcohol and an acid selected from the group consisting of organic carboxylic acids and inorganic polybasic acids.

4. A lubricant comprising a major proportion of a waxy mineral lubricating oil and a small but pour-depressing amount of an anluminum chloride condensation product of about 1 mol of aromatic hydrocarbon and about 0.5 to 2 mols of saturated ester having less than 10 carbon atoms of an alkyl alcohol having less than 7 carbon atoms and a fatty acid having less than 7 carbon atoms, said condensation product being soluble in mineral oils and being substantially non-volatile at temperatures up to 600° F. under fire and steam distillation.

5. A lubricant comprising a major proportion of waxy mineral lubricating oil and a small but pour-depressing amount of a Friedel-Crafts condensation product of an aromatic compound and a saturated acetoacetate ester having less than 10 carbon atoms, said condensation product being soluble in mineral oils and being substantially non-volatile at temperatures up to 600° F. under fire and steam distillation.

6. Lubricant according to claim 5 containing a condensation product of naphthalene and methyl acetoacetate.

7. A lubricant comprising a major proportion of a waxy mineral lubricating oil and a small but pour-depressing amount of a Friedel-Crafts condensation product of an aromatic hydrocarbon and ethyl acetate, said condensation product being soluble in mineral oils and substantially non-volatile at temperatures up to 600° F. under fire and steam distillation.

EUGENE LIEBER.